United States Patent
Okuoka et al.

(10) Patent No.: US 9,871,941 B2
(45) Date of Patent: Jan. 16, 2018

(54) OPERATION SYSTEM, SEARCH DEVICE AND SEARCH METHOD

(71) Applicant: FUJI XEROX CO., LTD., Tokyo (JP)

(72) Inventors: Takanori Okuoka, Yokohama (JP); Naoto Yamasaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/207,641

(22) Filed: Jul. 12, 2016

(65) Prior Publication Data

US 2017/0230532 A1 Aug. 10, 2017

(30) Foreign Application Priority Data

Feb. 8, 2016 (JP) .................................. 2016-021400

(51) Int. Cl.
  *G06F 3/12* (2006.01)
  *H04N 1/32* (2006.01)
  *H04N 1/00* (2006.01)

(52) U.S. Cl.
  CPC ....... *H04N 1/32101* (2013.01); *H04N 1/0083* (2013.01); *H04N 1/00411* (2013.01); *H04N 2201/0039* (2013.01); *H04N 2201/0094* (2013.01)

(58) Field of Classification Search
  CPC ........... H04N 1/32101; H04N 1/00411; H04N 1/0083; H04N 2201/0039; H04N 2201/0094
  USPC ....................................................... 358/1.15
  See application file for complete search history.

(56) References Cited

U.S. PATENT DOCUMENTS

| 8,854,648 B2 * | 10/2014 | Masuyama | ........... G06F 3/1221 358/1.13 |
| 2007/0195781 A1 | 8/2007 | Yuki | |
| 2010/0130240 A1 | 5/2010 | Hart | |

(Continued)

FOREIGN PATENT DOCUMENTS

| EP | 1531406 A2 | 5/2005 |
| JP | 3720585 B2 | 11/2005 |
| JP | 4682056 B2 | 5/2011 |

OTHER PUBLICATIONS

Jul. 5, 2017 Search Report issued in European Patent Application No. 16185206.6.

*Primary Examiner* — Neil R McLean
(74) *Attorney, Agent, or Firm* — Oliff PLC

(57) ABSTRACT

An operation system includes: an operation apparatus that includes a display displaying information and an operation unit receiving an operation, is connected to a communication network, and, using the display and the operation unit, enables other apparatus to operate through the communication network; an operation target apparatus that is connected to the operation apparatus in parallel using the communication network and a direct connection line and receives an operation through the communication network; a connection storing unit that is built in the operation apparatus, is connected to the operation target apparatus through the communication network and stores connection information used for operating the operation target apparatus; and a search device as defined herein, and the search device includes: a first information acquiring unit; a second information acquiring unit; an apparatus specifying unit; and a storage instructing unit as defined herein.

20 Claims, 12 Drawing Sheets

(56) References Cited

U.S. PATENT DOCUMENTS

2014/0075010 A1* 3/2014 Gupta ................ H04L 61/2007
709/224

* cited by examiner

OPERATION SYSTEM, SEARCH DEVICE AND SEARCH METHOD

CROSS-REFERENCE TO RELATED APPLICATIONS

This application is based on and claims priority under 35 USC 119 from Japanese Patent Application No. 2016-021400 filed on Feb. 8, 2016.

BACKGROUND

1. Technical Field

The present invention relates to an operation system, a search device and a search method.

2. Related Art

Print systems, in which a printer controller called a digital front end (DFE) or the like is attached to an image forming apparatus such as a multifunction device or a printer, handling processing and the like of image data transmitted, for instance, through a network (communication network) or the like have been conventionally known.

Recently, in order to reduce costs and the like, a form has also been known in which a printer controller configured as a small-size device not including a display, a keyboard, and the like is installed to a rear face or the like of an image forming apparatus and is connected using a dedicated cable (connection line). Among printer controllers having such a form, there is a printer controller that displays an operation screen of the printer controller on an operation panel included in the image forming apparatus and is operated by a user or like through the operation panel. The image forming apparatus and the printer controller are regarded as an operation apparatus operated by a user or the like and an operation target apparatus operated through the operation apparatus and configure an operation system.

As a scheme for displaying an operation screen on the operation panel in such an operation system, a scheme that displays the operation screen through a network without using a display cable with placing more importance on the versatility is generally used. For instance, there are cases where an access to the printer controller is made using a web browser function included in the operation panel of the image forming apparatus, and an operation screen of the printer controller is called and displayed. In the scheme displaying the operation screen through a network in this way, it is requested to register connection information such as an icon used for calling the operation screen in advance, and automation of such registration is desirable.

SUMMARY

According to an aspect of the invention, there is provided an operation system comprising: an operation apparatus that includes a display displaying information and an operation unit receiving an operation and, is connected to a communication network, and, using the display and the operation unit, enables other apparatus to operate through the communication network; an operation target apparatus that is connected to the operation apparatus in parallel using the communication network and a direct connection line and receives an operation through the communication network; a connection storing unit that is built in the operation apparatus, is connected to the operation target apparatus through the communication network and stores connection information used for operating the operation target apparatus; and a search device that is built in a first apparatus that is one of the operation apparatus and the operation target apparatus, and searches, through the communication network, for a second apparatus connected to the first apparatus with the connection line, wherein the search device includes: a first information acquiring unit that acquires identification information used for identifying the second apparatus from the second apparatus through the connection line; a second information acquiring unit that acquires, from each of at least one apparatus connected to the first apparatus through the communication network, identification information used for identifying the each of at least one apparatus through the communication network; an apparatus specifying unit that specifies an apparatus having same identification information as the identification information of the second apparatus from among the at least one apparatus of which the identification information is acquired by the second information acquiring unit; and a storage instructing unit that stores information used for connecting the apparatus specified by the apparatus specifying unit and the first apparatus through the communication network in the connection storing unit as the connection information.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the drawings.

Figure 1:
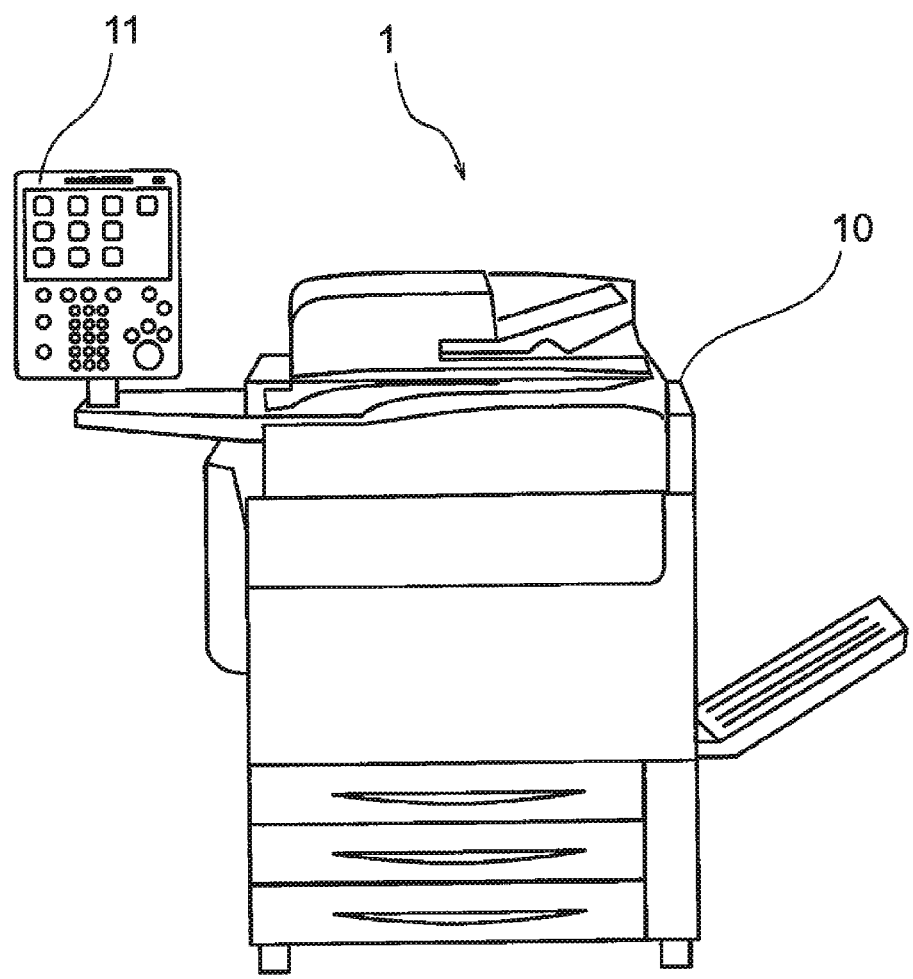
FIG. 1 is a diagram that illustrates a front-side external view of a printer system corresponding to an operation system according to a first exemplary embodiment of the present invention.
Figure 2:
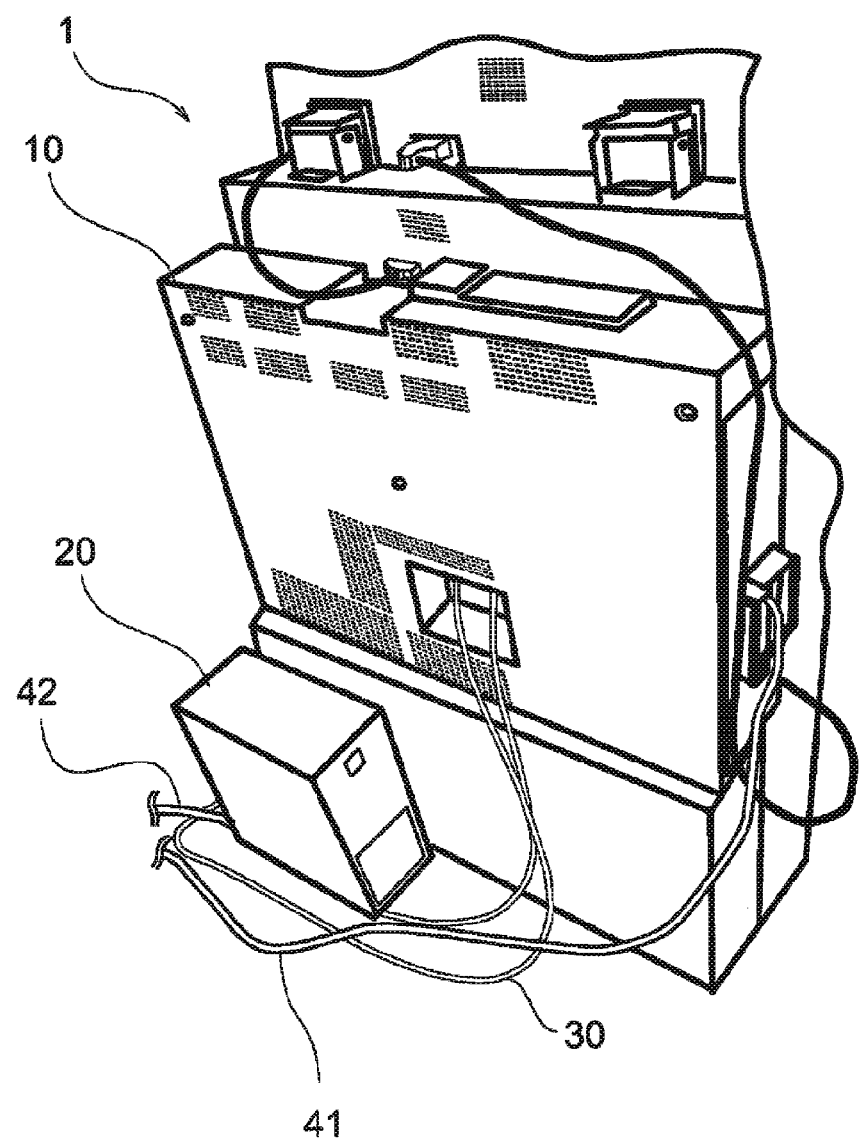
FIG. 2 is a diagram that illustrates a rear-side external view of a printer system corresponding to an operation system according to the first exemplary embodiment of the present invention.

FIG. 1 is a diagram that illustrates a front-side external view of a printer system corresponding to an operation system according to a first exemplary embodiment of the present invention, and FIG. 2 is a diagram that illustrates a rear-side external view of the printer system.

The printer system 1 illustrated in FIG. 1 includes a multifunction device 10, and an operation panel 11 to be described later in detail is included in the multifunction device 10. In addition, as illustrated in FIG. 2, this printer system 1 includes a printer controller 20 called a DFE on the rear side of the multifunction device 10.

This printer controller 20 is directly connected to the multifunction device 10 through a dedicated cable (print cable) 30. The multifunction device 10 and the printer controller 20 are respectively connected to a network such as a LAN through network cables 41 and 42, and the multifunction device 10 and the printer controller 20 are interconnected through the network.

In the connection made through the dedicated cable 30 is used for data transmission, command distribution, and the like between the multifunction device 10 and the printer controller 20, and data relating to an operation of the multifunction device 10 as a printer and the like are exchanged. On the other hand, in the connection made through the network, information of an operation screen that is necessary for the operation of the printer controller 20 using the operation panel 11 and the like are exchanged.

The multifunction device 10 corresponds to an instance of an operation apparatus according to the present invention, and the printer controller 20 corresponds to an instance of an operation target apparatus according to the present invention. In addition, the dedicated cable 30 corresponds to an instance of a connection line according to the present invention.

Here, while an instance in which one printer controller 20 is connected to one multifunction device 10 is illustrated, plural dedicated cables 30 can be connected to the multifunction device 10 illustrated here, and there are cases where plural printer controllers 20 are connected to one multifunction device 10.

Figure 3:
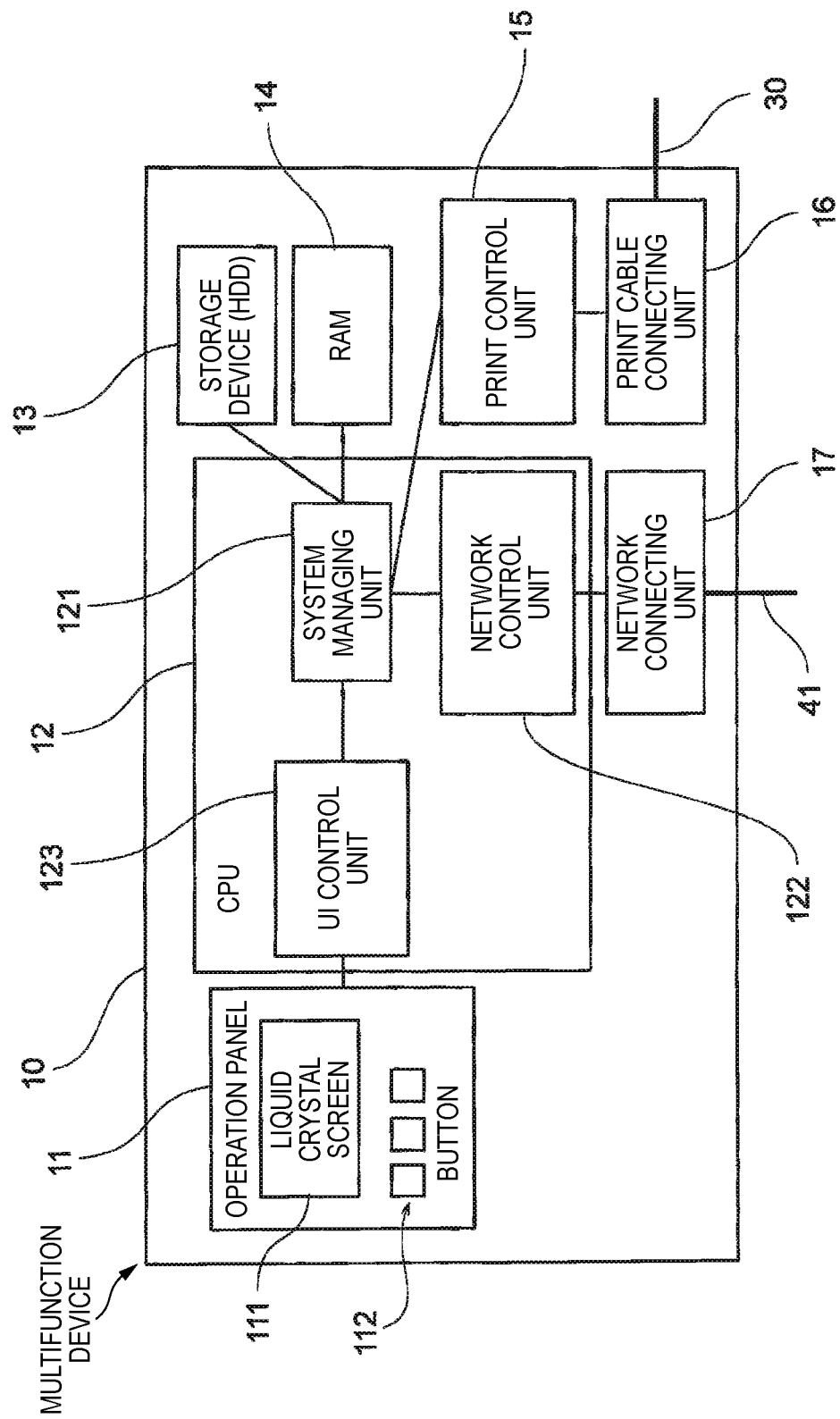
FIG. 3 is a diagram that illustrates the functional configuration of a multifunction device.

FIG. 3 is a diagram that illustrates the functional configuration of the multifunction device 10.

The multifunction device 10 is one type of image forming apparatus. While a function for forming an image on a sheet is mounted in the multifunction device 10, in FIG. 3, functions mainly relating to control and operations are illustrated, and the image forming function is not illustrated.

As described above, the multifunction device 10 includes the operation panel 11, and a liquid crystal screen 111 and operation buttons 112 are disposed on the operation panel 11.

The multifunction device 10 also includes a CPU 12, an HDD 13 that is a storage device, and a RAM 14 that is a storage element. The HDD 13 is used for storing a program and data and serves as an instance of a connection storing unit according to the present invention. The RAM 14 is used for temporary storage of a program and data. The CPU 12 executes a program, thereby realizing functions as a system managing unit 121, a network control unit 122, and a UI control unit 123.

The system managing unit 121 manages the overall operation of the multifunction device 10, the network control unit 122 controls a connection between the multifunction device 10 and a network, and the UI control unit 123 controls user's operation using the operation panel 11 or the like.

In the multifunction device 10, a print control unit 15, a print cable connecting unit 16, and a network connecting unit 17 are further included. The print control unit 15 includes a dedicated CPU and is responsible for communication of image data or information through the dedicated cable 30 and the like. The print cable connecting unit 16 includes a connector, and the dedicated cable 30 is physically connected thereto. The network connecting unit 17 includes a connector, and the network cable 41 is physically connected thereto.

Figure 4:
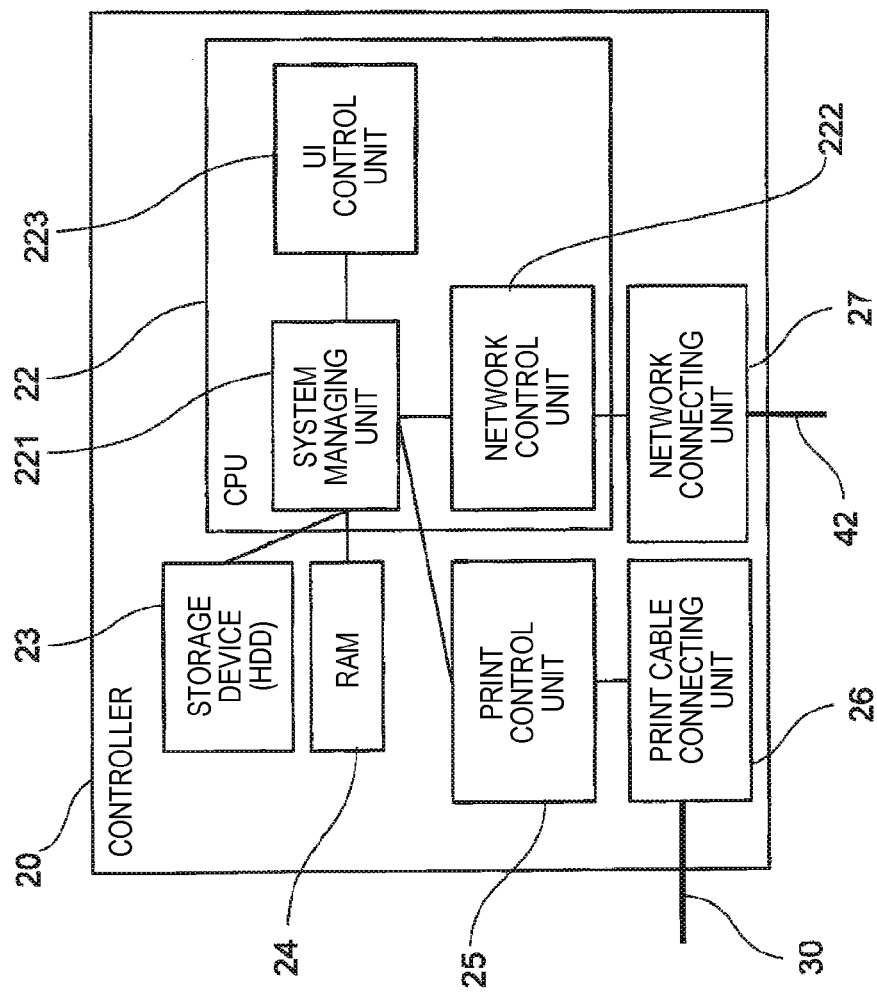
FIG. 4 is a functional configuration of a printer controller.

FIG. 4 is a functional configuration of the printer controller 20.

The printer controller 20 also includes a CPU 22, an HDD 23 that is a storage device, and a RAM 24 that is a storage element. The HDD 23 is used for storing programs and data, and, according to this first exemplary embodiment, a search program according to an exemplary embodiment of the present invention is stored therein. The RAM 24 is used for temporary storage of programs and data.

The CPU 22 realizes functions as a system managing unit 221, a network control unit 222, and a UI control unit 223 by executing a search program according to an exemplary embodiment and operates as an instance of a search device according to the present invention.

The system managing unit 221 manages the overall operation of the printer controller 20, the network control unit 222 controls a connection between the printer controller 20 and the network, and the UI control unit 223 generates an operation screen for a user's operation performed through the network using the operation panel 11 of the multifunction device 10.

The printer controller 20 further includes a print control unit 25, a print cable connecting unit 26, and a network connecting unit 27. The print control unit 25 includes a dedicated CPU and is responsible for communication of image data and information through the dedicated cable 30 and the like. The print cable connecting unit 26 includes a connector, and the dedicated cable 30 is physically connected thereto. The network connecting unit 27 includes a connector, and the network cable 42 is physically connected thereto.

Figure 5:
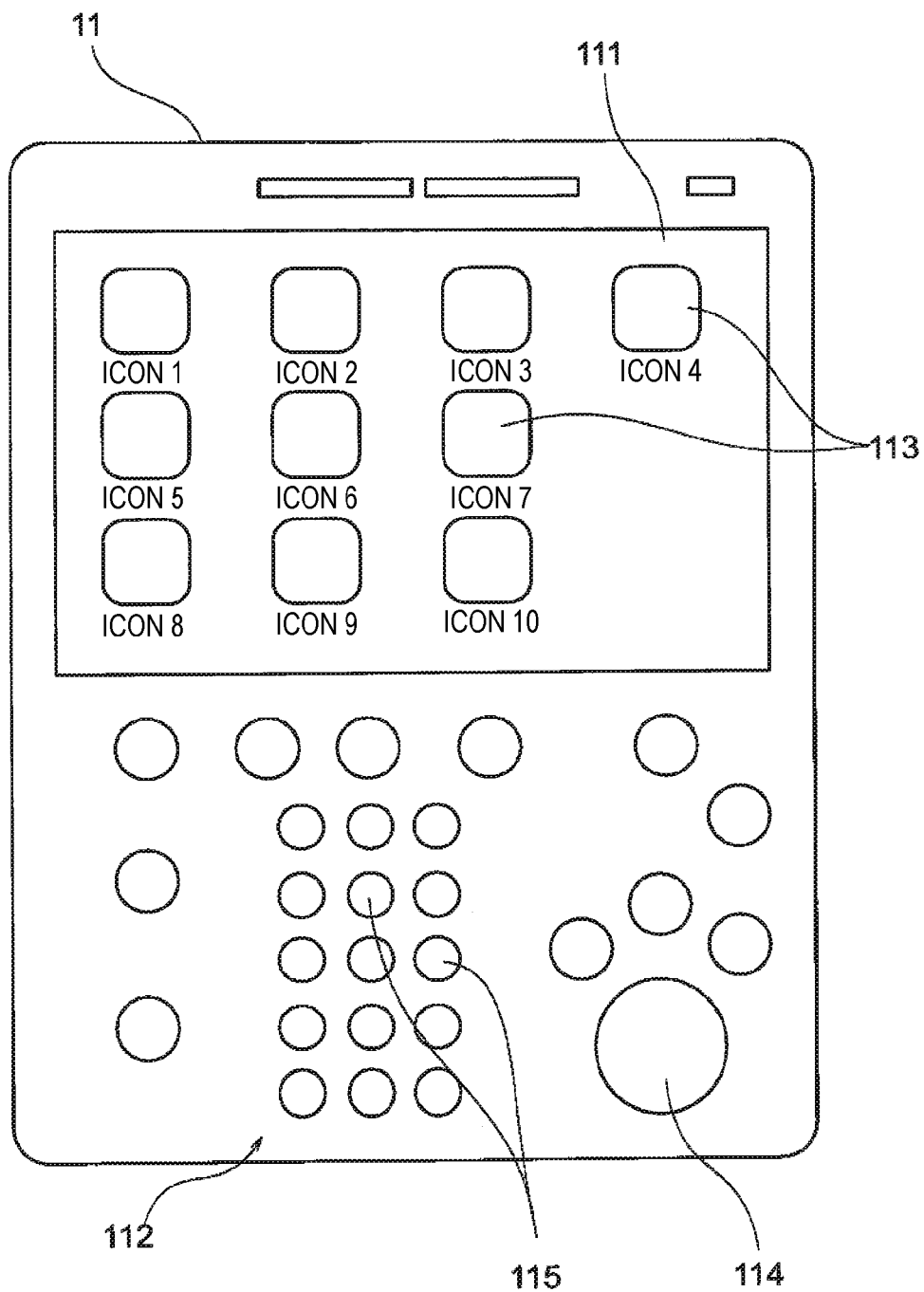
FIG. 5 is a diagram that illustrates an operation panel in detail.

FIG. 5 is a diagram that illustrates the operation panel 11 in detail.

As described above, the operation panel 11 includes the liquid crystal screen 111 and the operation buttons 112, and, on the liquid crystal screen 111, icons 113 representing various functions are displayed. The operation buttons 112 includes a start button 114 and numerical key buttons 115. In this exemplary embodiment, in the liquid crystal screen 111, a function of a touch panel is built. The liquid crystal screen 111 corresponds to an instance of a display according to the present invention, and the operation buttons 112 and the touch panel correspond to an instance of an operation unit according to the present invention.

When a user selects an icon 113 by using the operation buttons 112 or the touch panel function of the liquid crystal screen 111, a function represented by the icon 113 is called. In this exemplary embodiment, an operation of the printer controller 20 is registered as an icon 113, and, as the icon 113 is selected, an operation screen is displayed on the liquid crystal screen 111.

Figure 6:
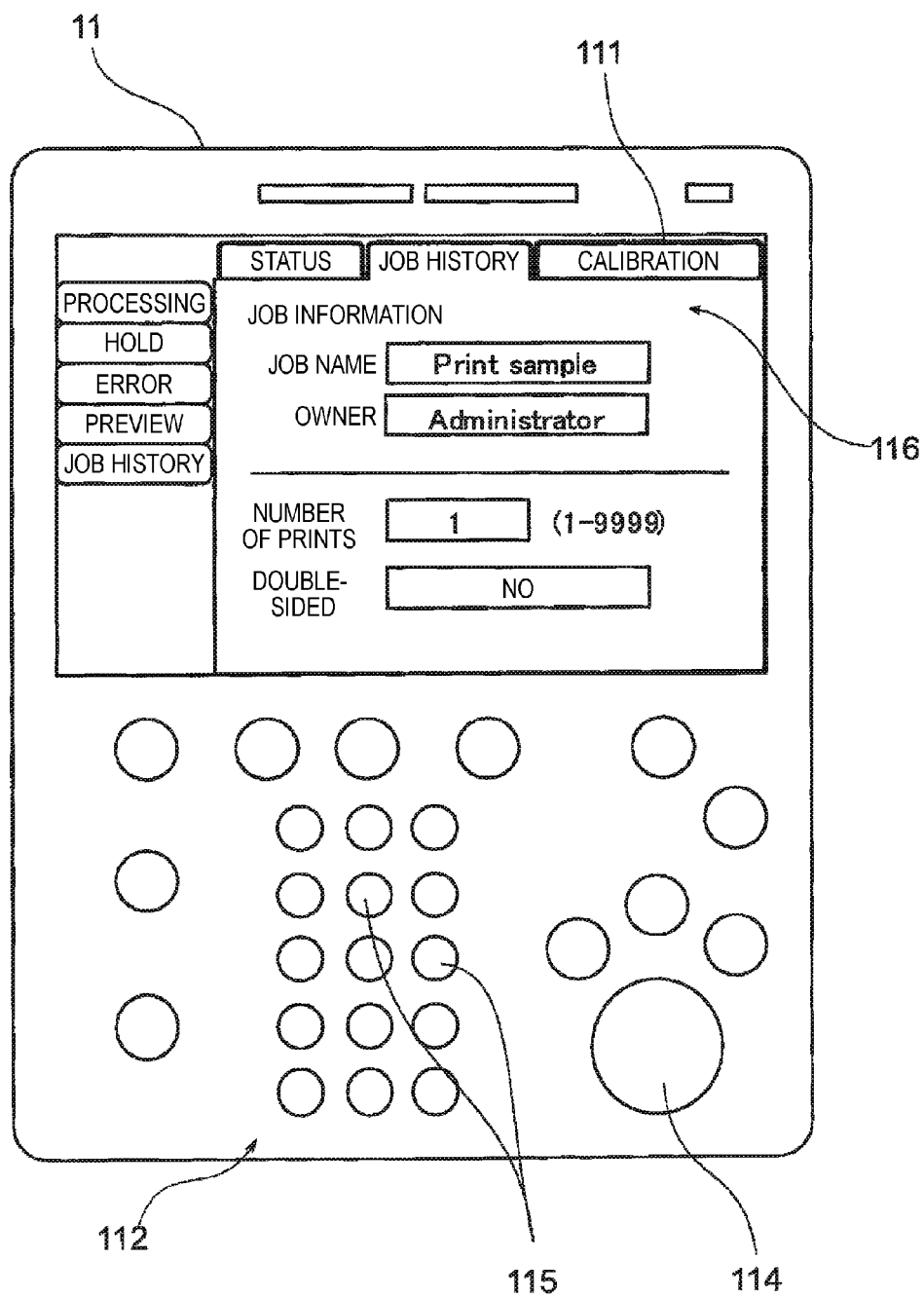
FIG. 6 is a diagram that illustrates an instance of an operation screen displayed on an operation panel.

FIG. 6 is a diagram that illustrates an instance of the operation screen displayed on the operation panel 11.

In FIG. 6, an operation screen 116 displayed on the liquid crystal screen 111 of the operation panel 11 is illustrated. On this operation screen 116, for instance, a name of a print job, an owner name of the print job, and the like are displayed. In addition, on this operation screen 116, for instance, information such as the number of prints of a print job, duplex printing or not, and the like is input according to the touch panel function of the liquid crystal screen 111, an operation of the numerical keys 115 or the like of the operation buttons 112. The information input in this way is transmitted to the printer controller 20 through the network and is used for print control performed by the printer controller 20.

In this exemplary embodiment, the icons 113 used for calling such an operation screen 116 are automatically registered in advance. Hereinafter, a processing operation used for registering these icons 113 will be described. In a flowchart used in description presented below, the multifunction device 10 will be denoted as a "printer".

Figure 7:
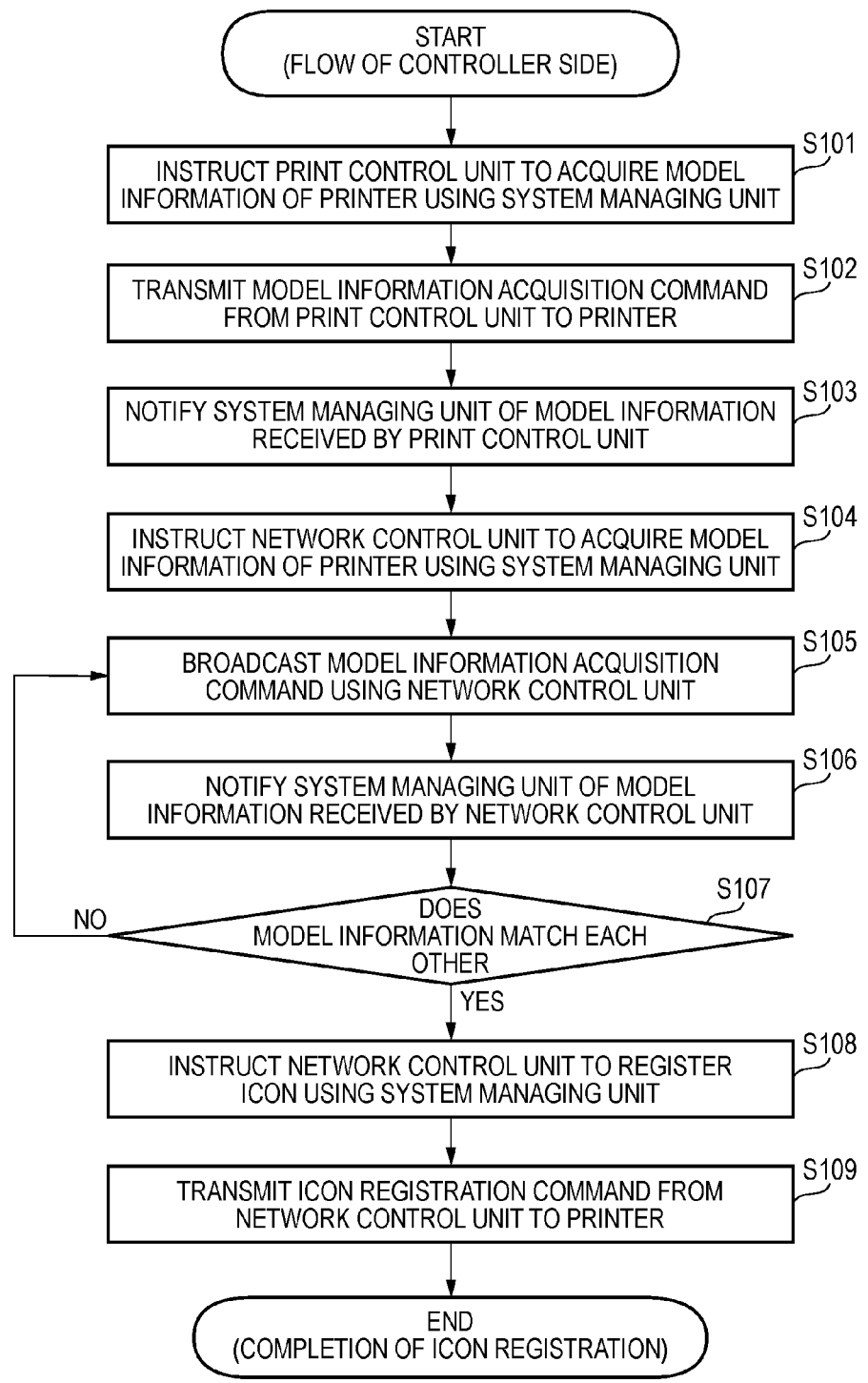
FIG. 7 is a flowchart that illustrates the operation sequence of a printer controller for registering an icon used for calling an operation screen.

FIG. 7 is a flowchart that illustrates the operation sequence of the printer controller for registering an icon used for calling an operation screen.

In the first exemplary embodiment, the operation illustrated in the flowchart illustrated in FIG. 7 is started by being triggered upon the startup of the printer controller 20. When this operation is started, in Step S101, the system managing unit 221 of the printer controller 20 instructs the print control unit 25 to acquire model information (a model name and an individual identification number) of the multifunction device 10. The print control unit 25 that has received this instruction transmits a model information acquisition command to the multifunction device 10 through the print cable connecting unit 26 and the dedicated cable 30 and acquires the model information (Step S102). In addition, the print control unit 25 notifies the system managing unit 221 of the model information received in Step S102 (Step S103). The system managing unit 221 corresponds to an instance of a first information acquiring unit according to the present invention.

The system managing unit 221 of the printer controller 20 instructs the network control unit 222 to acquire information of the multifunction device (Step S104). The network control unit 222 that has received this instruction broadcasts a command (SNMP) for acquiring the model information of the multifunction device through the network connecting unit 27 and acquires the model information from the multifunction device connected to the network (Step S105). At this time, the multifunction device that has notified the network control unit 222 of the model information is not limited to the multifunction device 10 connected 10 to the printer controller 20 through the dedicated cable 30, but one or more multifunction devices connected to the same network as that of the printer controller 20 give notifications of the model information. In addition, together with the model information, an IP address for accessing the multifunction device that has given the model information through the network is acquired. Then, every time when information (the model information and the IP address) is acquired from one multifunction device, the network control unit 222 notifies the system managing unit 221 of the acquired information (Step S106). The network control unit 222 corresponds to an instance of a second information acquiring unit according to the present invention.

The system managing unit 221 of the printer controller 20 compares the model information notified in Step S103 with the model information notified in Step S106 (Step S107). In a case where the model information does not match each other (Step S107: No), the system managing unit 221 and the network control unit 222 repeat the process of Steps S105 to S107.

On the other hand, in a case where the model information matches each other through the comparison of Step S107 (Step S107: Yes), the system managing unit 221 determines that the IP address notified together with the model information is an IP address of the multifunction device 10 connected through the dedicated cable. The system managing unit 221 also corresponds to an instance of a specifying unit according to the present invention. The system managing unit 221 instructs the network control unit 222 to transmit an icon registration command toward the IP address of the multifunction device 10 (Step S108).

The network control unit 222 that has received the instruction transmits the icon registration command to a designated IP address through the network connecting unit 27. To this command, an IP address of the printer controller 20 as a parameter is attached. In the multifunction device 10 that has received this command, an icon calling the operation screen is registered. The network control unit 222 corresponds to an instance of a storage instruction unit according to the present invention.

The process represented by the flowchart illustrated in FIG. 7 corresponds to a search method according to an exemplary embodiment of the present invention.

Here, the process of Steps S102 to S103 and the process of Steps S105 to S106 do not necessarily need to be performed in the sequence illustrated in FIG. 7 as an operation system according to this exemplary embodiment, but, after acquiring the model information from each multifunction device connected through the network in the process of Steps S105 to S106, the model information may be acquired from the multifunction device 10 connected to the dedicated cable in the process of Steps S102 to S103.

For the multifunction device 10 that has already given the instruction for the transmission of the icon registration command in the process of Step S108, the model information or the IP address is registered in the HDD 23 of the printer controller 20, and, in a case where the model information or the IP address that is the same as the model information or the IP address that is registered is acquired, a useless registration process is avoided by stopping the process of the flowchart illustrated in FIG. 7.

Figure 8:
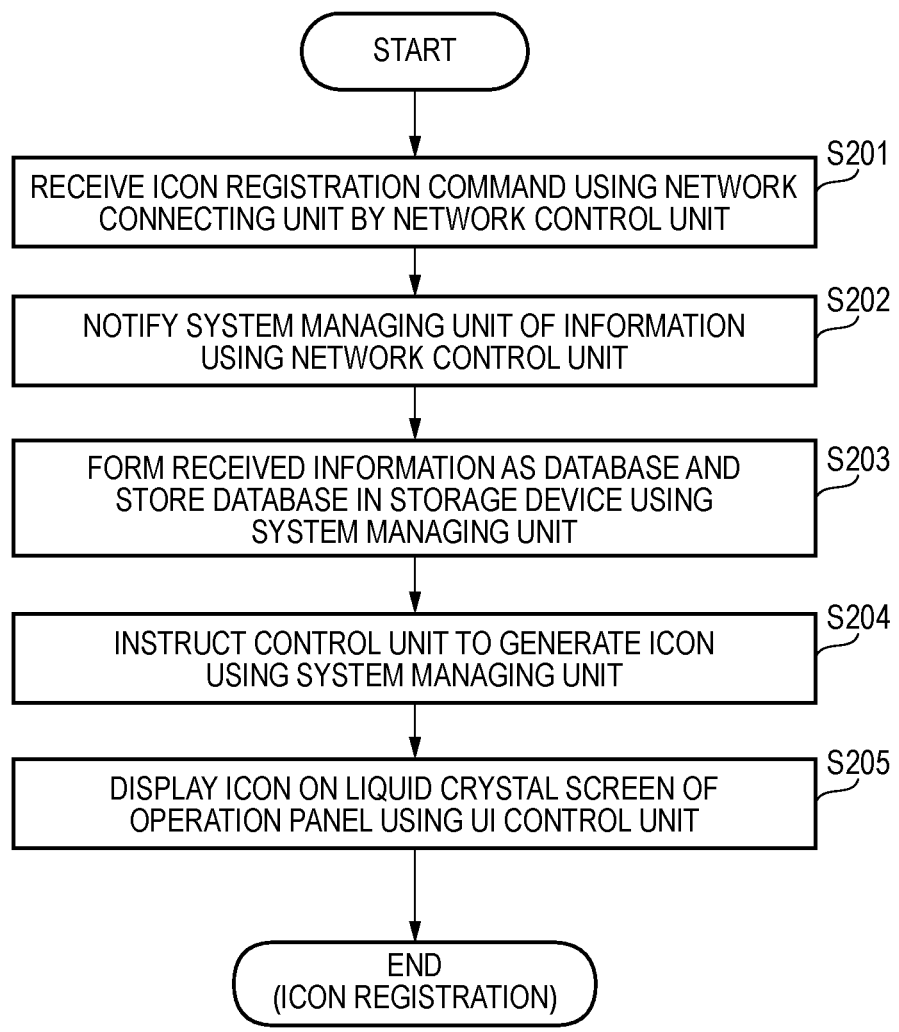
FIG. 8 is a flowchart that illustrates a sequence in which an icon is registered in a multifunction device.

FIG. 8 is a flowchart that illustrates a sequence in which an icon is registered in the multifunction device 10.

First, in Step S201, the network control unit 122 of the multifunction device 10 receives an icon registration command from the network connecting unit 17. Then, the network control unit 122 transmits the received command and the parameter (the IP address of the printer controller 20) to the system managing unit 121 (Step S202).

The system managing unit 121 configures the IP address of the printer controller 20 received in Step S202 as icon information as a database and stores the database in the HDD 13 that is a storage device (Step S203). This icon information corresponds to an instance of connection information according to the present invention, and, as described above, the HDD 13 corresponds to an instance of the connection storing unit according to the present invention. By prioritizing the security, it may be configured such that a supervisor ID and a password of the multifunction device 10 are added in the parameter of the command, and, only in a case where the supervisor ID and the password are correct, the system managing unit 121 registers the IP address as the icon information.

As an instance of the icon information, a set of the IP address of the printer controller 20, position information of the operation panel 11 on the liquid crystal screen 111, and identification information (a display name, a form of the icon, and the like) on the operation panel 11 is stored for each icon. As the connection information according to the present invention, only the IP address of the printer controller 20 may be stored. In this exemplary embodiment while a scheme in which the database of the icon information can be used by both the system managing unit 121 and the UI control unit 123 is employed, the connection storing unit according to the present invention may be managed by the system managing unit 121 in a unified manner or may be managed by the UI control unit 123 in a unified manner.

The system managing unit 121 that has stored the icon information in Step S203 instructs the UI control unit 123 to generate an icon represented by the icon information (Step S204).

The UI control unit 123 that has received the instruction displays the icon on the liquid crystal screen 111 of the operation panel 11 based on the icon information and adds position information of the icon to the database of the HDD 13 (Step S205).

The icon is generated in this sequence, and, when a user performs an icon operation (for instance, an operation of pressing on the icon), the operation screen 116 as illustrated in FIG. 6 is displayed.

Figure 9:
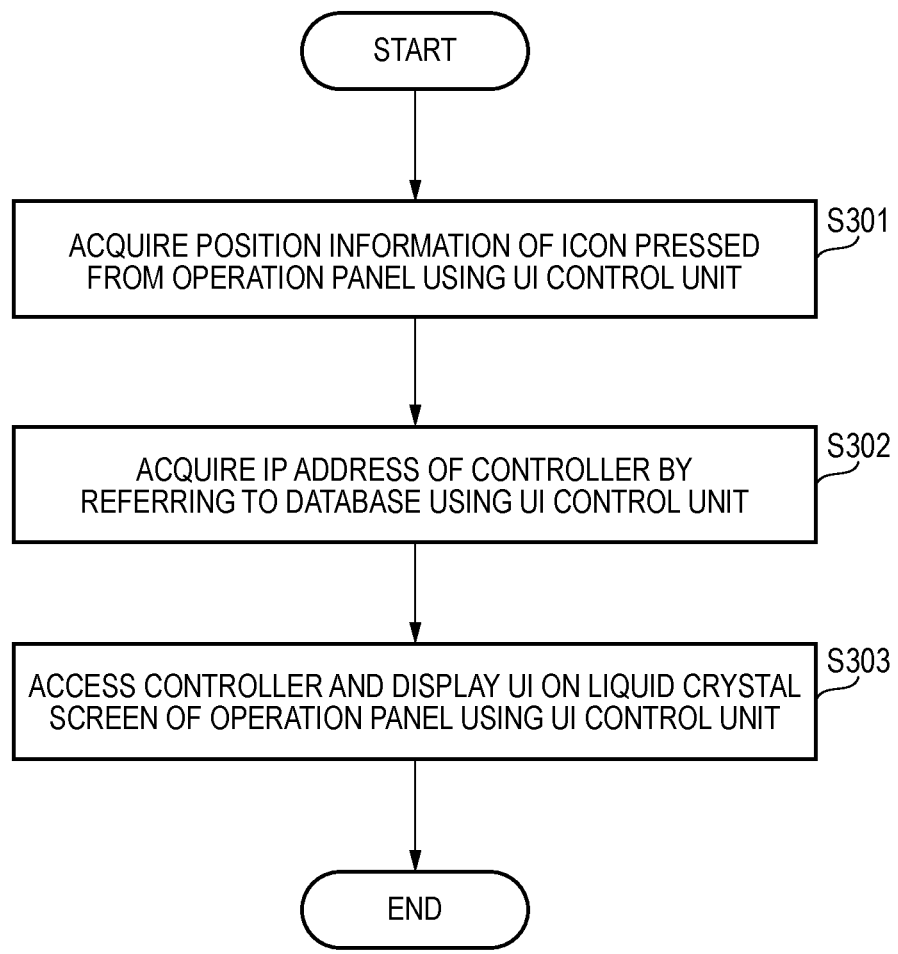
FIG. 9 is a flowchart that illustrates an operation performed at the time of operating an icon.

FIG. 9 is a flowchart that illustrates an operation performed at the time of operating an icon.

First, the UI control unit 123 of the multifunction device 10 acquires the position information of a pressed icon from the operation panel 11 (Step S301). Then, the UI control unit 123 searches for the IP address of the printer controller 20 that matches the position information of the icon by referring to the database of the icon information (Step S302). In a case where the matching IP address is found, the UI control unit 123 accesses a printer controller 20 having the IP address through the system managing unit 121 and the network control unit 122, acquires an operation screen generated by the UI control unit 223 of the printer controller 20, and displays the acquired operation screen on the liquid crystal screen 111 of the operation panel 11.

The user operates the operation screen displayed in this way, thereby operating the printer controller 20.

Next, a second exemplary embodiment of the present invention will be described. This second exemplary embodiment has a form similar to the first exemplary embodiment described above except for the processes performed in the multifunction device 10 and the printer controller 20. Thus, hereinafter, description will be presented based on the flowcharts, and FIGS. 3 and 4 and the like will be directly reused for the description of the second exemplary embodiment.

Figure 10:
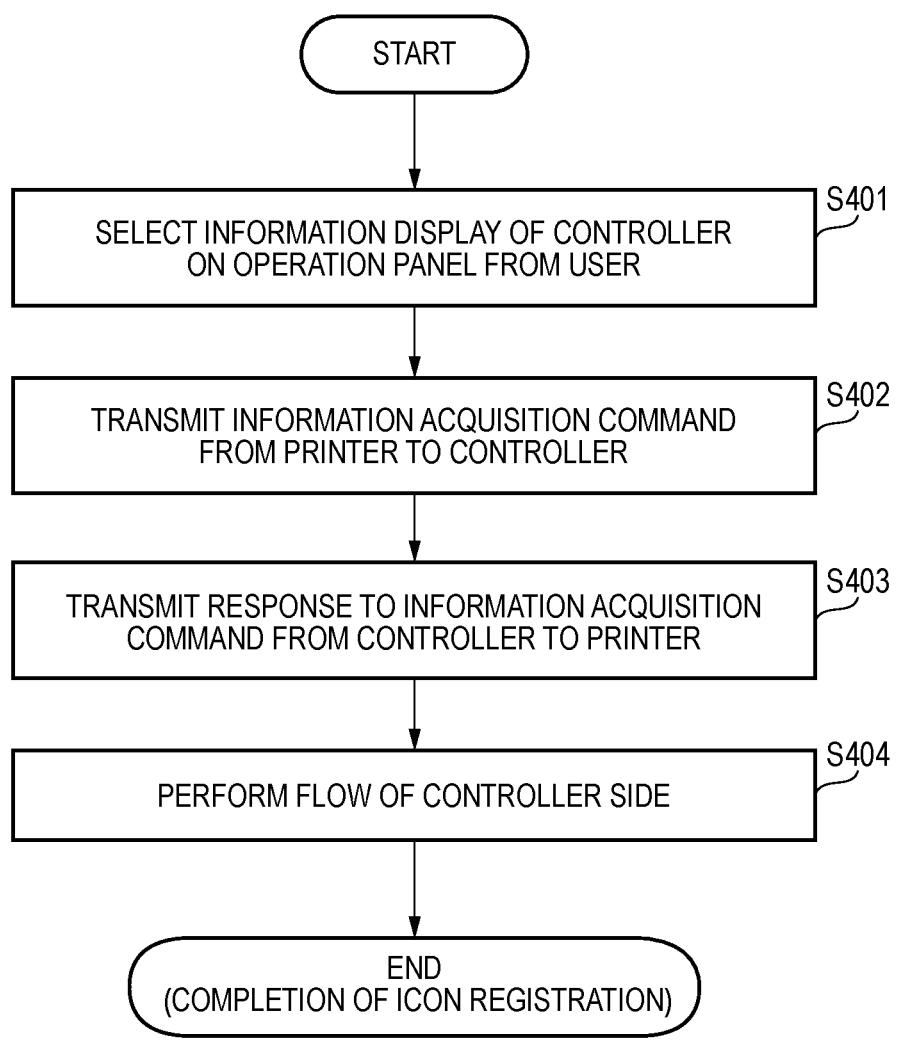
FIG. 10 is a flowchart according to a second exemplary embodiment that illustrates the operation sequence for registering an icon used for calling an operation screen.

FIG. 10 is a flowchart according to a second exemplary embodiment that illustrates the operation sequence for registering an icon used for calling an operation screen.

In the first exemplary embodiment described above, while the icon registration process is started by being triggered upon the startup of the printer controller 20, in the second exemplary embodiment, the icon registration process is started in a case where the user performs an operation of requesting registration by using the multifunction device 10. In a case where the icon registration process is started by being triggered upon such an operation, the process is started in a case where user's permission is acquired, and accordingly, a process that is not desired by the user is suppressed from being performed.

First, a user requests information display of the printer controller 20, for instance, on the operation panel 11 by operating the operation panel 11 of the multifunction device 10 (Step S401). Then, an information acquisition command is transmitted from the multifunction device 10 to the printer controller 20 through the dedicated cable 30 (Step S402). The printer controller 20 that has received the information acquisition command transmits model information and the like to the multifunction device 10 as a response to the information acquisition command (Step S403). In addition, the printer controller 20 performs a process similar to the process represented by the flowchart illustrated in FIG. 7, whereby an icon is registered on the multifunction device 10 (Step S404).

Next, a third exemplary embodiment of the present invention will be described. This third exemplary embodiment has a form similar to the second exemplary embodiment except for a trigger for the start of the icon registration process, and thus, different points from the second exemplary embodiment will be focused in the description.

Figure 11:
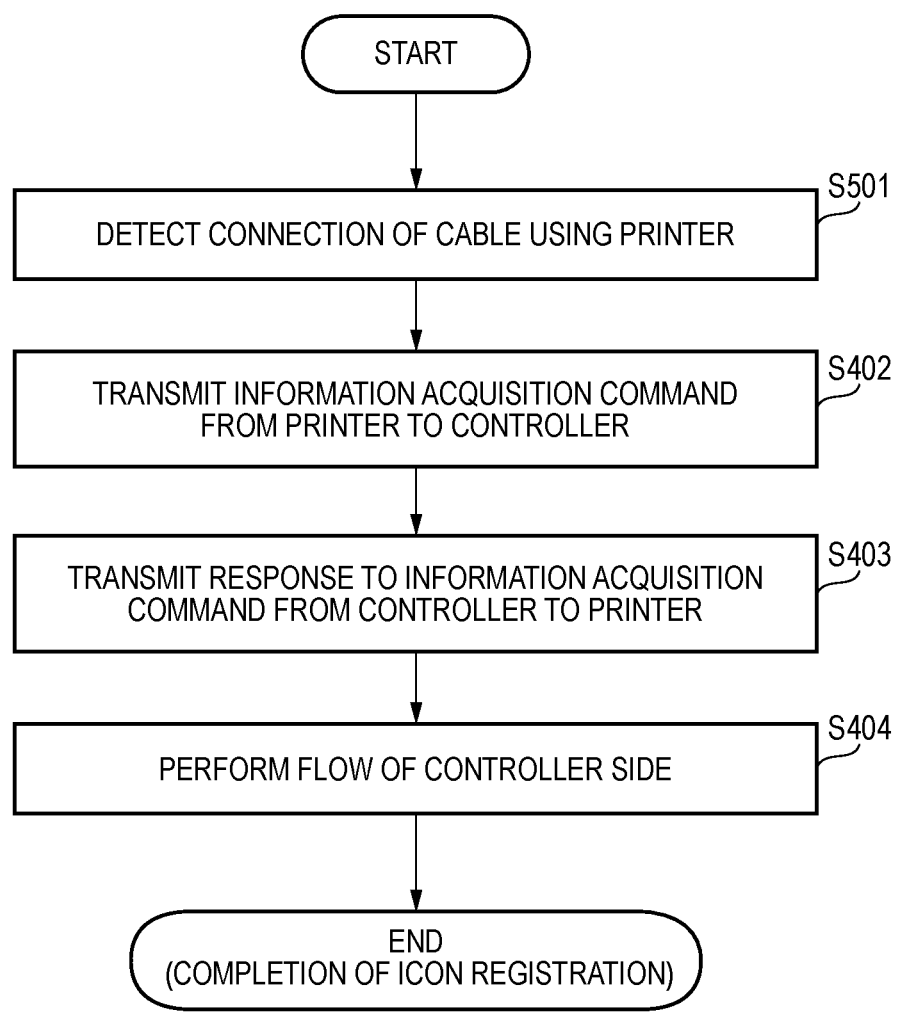
FIG. 11 is a flowchart according to a third exemplary embodiment that illustrates the operation sequence for registering an icon used for calling an operation screen.

FIG. 11 is a flowchart according to a third exemplary embodiment that illustrates the operation sequence for registering an icon used for calling an operation screen.

First, the network control unit 122 of the multifunction device 10 and the print control unit 15 detect a physical connections of a cable to the print cable connecting unit 16 and the network connecting unit 17 (Step S501). By being triggered upon this detection, similar to the second exemplary embodiment, the process of Steps S402 to S404 is performed. In this way, in a case where the connection of the cable is used as the trigger, compared to a case where the startup is used as the trigger, there is an advantage that an unnecessary process is suppressed from being repeated.

Next, a fourth exemplary embodiment of the present invention will be described. This fourth exemplary embodiment has a form similar to the first exemplary embodiment described above except for the processes performed in the multifunction device 10 and the printer controller 20. Thus, hereinafter, description will be presented based on the flowcharts, and FIGS. 3 and 4 and the like will be directly reused for the description of the fourth exemplary embodiment.

Figure 12:
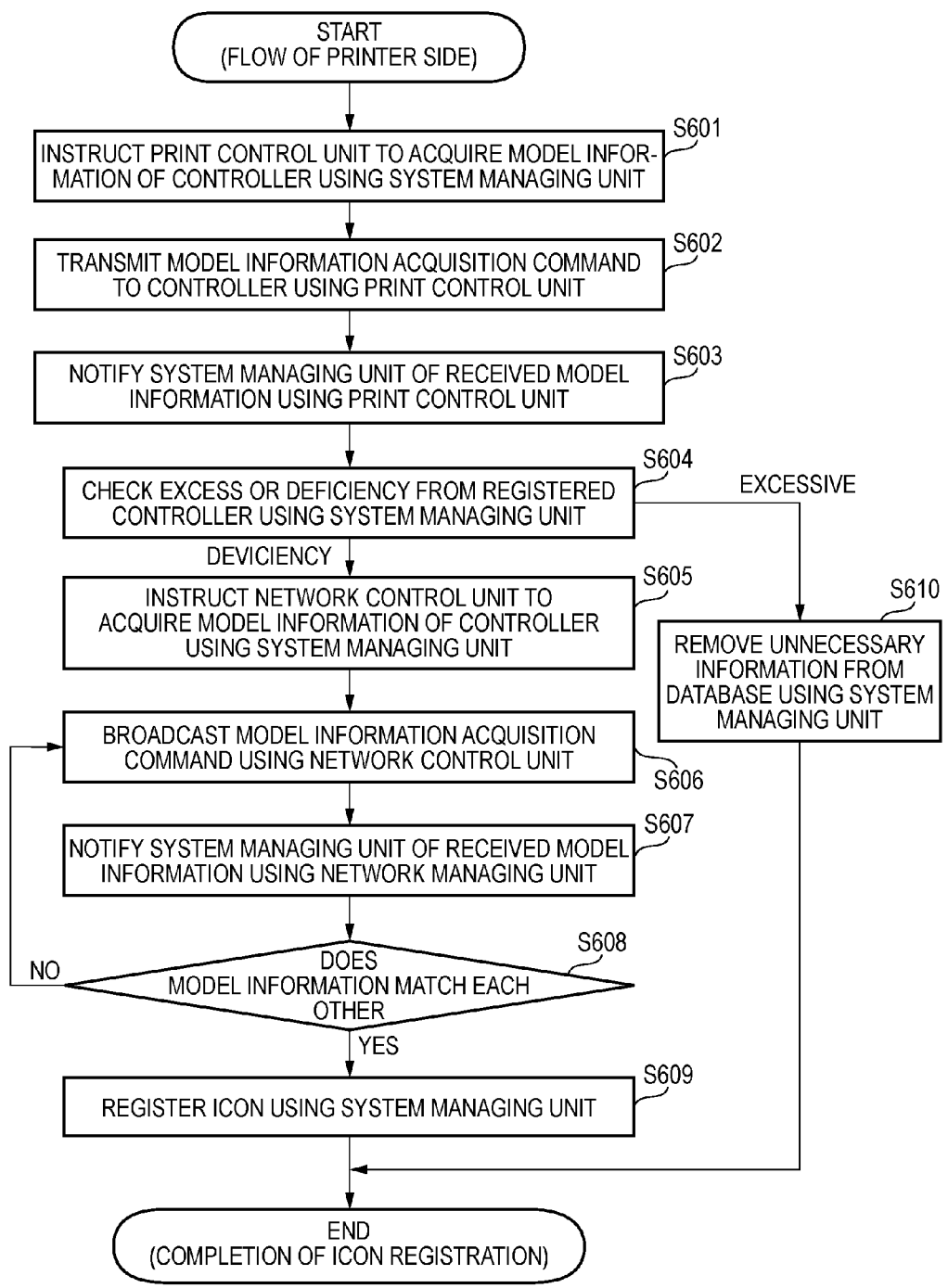
FIG. 12 is a flowchart according to a fourth exemplary embodiment that illustrates the operation sequence of a multifunction device for registering an icon used for calling an operation screen.

FIG. 12 is a flowchart according to a fourth exemplary embodiment that illustrates the operation sequence of a multifunction device 10 for registering an icon used for calling an operation screen.

In the fourth exemplary embodiment, the operation represented by the flowchart illustrated in FIG. 12 is started by being triggered upon the startup of the multifunction device 10. In this fourth exemplary embodiment, the CPU 12 of the multifunction device 10 illustrated in FIG. 3 executes a search program according to an exemplary embodiment, thereby operating as an instance of a search device according to the present invention. The operation process represented by the flowchart illustrated in FIG. 12 corresponds to a search method according to an exemplary embodiment of the present invention.

When the operation represented by the flowchart illustrated in FIG. 12 is started, in Step S601, the system managing unit 121 of the multifunction device 10 instructs the print control unit 15 to acquire model information (a model name and an individual identification number) of the printer controller 20. The print control unit 15 that has received this instruction transmits a model information acquisition command to the printer controller 20 through the print cable connecting unit 16 and the dedicated cable 30 and acquires the model information (Step S602). In addition, the print control unit 15 notifies the system managing unit 121 of the model information received in Step S602 (Step S603). The system managing unit 121 corresponds to an instance of a first information acquiring unit according to the present invention. In addition, the model information acquisition command is transmitted to all the printer controllers 20 connected to the multifunction device 10 through the dedicated cable 30, and model information is acquired from all the printer controllers 20.

Next, the system managing unit 121 of the multifunction device 10 accesses the database of the icon information and checks excess or deficiency between the printer controllers 20 of which the icon information is registered and the printer controllers 20 of which the model information is acquired in Step S603 (Step S604). Through this checking process, in a case where the icon information is determined to have been registered for all the printer controllers of which the model information is acquired, the process proceeds to Step S610, and, unnecessary icon information corresponding to a printer controller of which the model information is not acquired in Step S603 is removed from the database, and the processing operation of the icon registration ends. In this way, the registration information of the database is rearranged.

On the other hand, through the checking process of Step S604, in a case where it is determined that there is a printer controller 20 of which corresponding icon information has not been registered among the printer controllers 20 of which the model information has been acquired, the system managing unit 121 of the multifunction device 10 instructs the network control unit 122 to acquire information of the multifunction device (Step S605). The network control unit 122 that has received this instruction broadcasts a command (SNMP) for acquiring model information of the printer controller through the network connecting unit 17 and acquires the model information from the printer controller connected to the network (Step S606). At this time, the printer controller that notifies the network control unit 122 of the model information is not limited the printer controller 20 connected to the multifunction device 10 through the dedicated cable 30, but one or more printer controllers connected to the same network as that of the multifunction device 10 notifies the network control unit 122 of the model information. In addition, together with the model information, an IP address used for accessing the printer controller that has notified the model information through the network is also acquired. Then, every time when information (the model information and the IP address) is acquired from one printer controller, the network control unit 122 notifies the system managing unit 121 of the acquired information (Step S607). The network control unit 122 corresponds to an instance of a second information acquiring unit according to the present invention.

The system managing unit 121 of the multifunction device 10 compares the model information notified in Step S603 with the model information notified in Step S607 (Step S608). In a case where the model information does not match each other (Step S608: No), the system managing unit 121 and the network control unit 122 repeat the process of Steps S606 to S608.

On the other hand, in a case where the model information matches each other through the comparison of Step S608 (Step S608: Yes), the system managing unit 121 determines that the IP address notified together with the model information is an IP address of the printer controller 20 connected through the dedicated cable. The system managing unit 121 also corresponds to an instance of a specifying unit according to the present invention. Then, the system managing unit 121 forms the IP address as the icon information as a database and stores the database in the HDD 13 that is a storage device (Step S609). The system managing unit 121 also corresponds to an instance of a storage instructing unit according to the present invention.

In this way, according to the fourth exemplary embodiment, broadcast is performed on the multifunction device 10 side, and accordingly, different from the first exemplary embodiment and the like, the IP address does not need to be transmitted from the printer controller 20 to the multifunction device 10.

In the description presented above, while the print system has been illustrated as an instance as an operation system according to an exemplary embodiment of the present invention, the operation system according to the present invention may be applied to a system other than the print system.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An operation system comprising:
    an operation apparatus that (i) comprises a display displaying information and an operation unit receiving an operation, (ii) is connected to a communication network, and (iii), using the display and the operation unit, enables another apparatus to operate through the communication network;
    an operation target apparatus that is connected to the operation apparatus by way of the communication network and by way of a direct connection line and that receives an operation through the communication network;
    a memory that (i) is built in the operation apparatus, (ii) is connected to the operation target apparatus through the communication network, and (iii) stores connection information used for operating the operation target apparatus; and
    a search device that is built in a first apparatus, which is one of the operation apparatus and the operation target apparatus, and searches, through the communication network, for a second apparatus connected to the first apparatus with the connection line,
    wherein the search device is at least one central processing unit configured to function as:
    a first information acquiring unit that acquires, through the connection line, identification information used for identifying the second apparatus from the second apparatus;
    a second information acquiring unit that acquires, through the communication network and from each of at least one apparatus connected to the first apparatus through the communication network, identification information used for identifying each of the at least one apparatus;
    an apparatus specifying unit that specifies, from among the at least one apparatus for which the identification information is acquired by the second information acquiring unit, an apparatus having same identification information as the identification information of the second apparatus; and
    a storage instructing unit that stores, in the memory as the connection information, information used for connecting the apparatus specified by the apparatus specifying unit and the first apparatus through the communication network.

2. The operation system according to claim 1, wherein the display and the operation unit are indirectly connected to the operation target apparatus through the operation apparatus.

3. The operation system according to claim 1, wherein
the first apparatus is the operation target apparatus, and
the storage instructing unit transmits the connection information to the operation apparatus through the communication network and gives an instruction for storing the connection information.

4. The operation system according to claim 2, wherein
the first apparatus is the operation target apparatus, and
the storage instructing unit transmits the connection information to the operation apparatus through the communication network and gives an instruction for storing the connection information.

5. The operation system according to claim 3, wherein
the storage instructing unit transmits an instruction for generating a mark that is displayed in the display representing the operation target apparatus and causes connection to the operation target apparatus through the communication network to be started by being selected by an operation of the operation unit to the operation apparatus as the instruction for storing the connection information.

6. The operation system according to claim 4, wherein
the storage instructing unit transmits an instruction for generating a mark that is displayed in the display representing the operation target apparatus and causes connection to the operation target apparatus through the communication network to be started by being selected by an operation of the operation unit to the operation apparatus as the instruction for storing the connection information.

7. The operation system according to claim 1, wherein
the first apparatus is the operation apparatus, and
the storage instructing unit stores information used for the operation apparatus to be connected to the apparatus specified by the specifying unit through the communication network in the memory as the connection information.

8. The operation system according to claim 2, wherein
the first apparatus is the operation apparatus, and
the storage instructing unit stores information used for the operation apparatus to be connected to the apparatus specified by the specifying unit through the communication network in the memory as the connection information.

9. The operation system according to claim 1, wherein
the search device performs a search by being triggered upon startup of at least one of the first apparatus and the second apparatus.

10. The operation system according to claim 2, wherein
the search device performs a search by being triggered upon startup of at least one of the first apparatus and the second apparatus.

11. The operation system according to claim 1, wherein
the search device performs a search by being triggered upon a physical connection between at least one of the first apparatus and the second apparatus and at least one of the connection line and the communication network.

12. The operation system according to claim 2, wherein
the search device performs a search by being triggered upon a physical connection between at least one of the first apparatus and the second apparatus and at least one of the connection line and the communication network.

13. The operation system according to claim 1, wherein
the search device performs a search in a case where number of the operation target apparatuses connected to the operation apparatus through the connection line is increased.

14. The operation system according to claim 2, wherein
the search device performs a search in a case where number of the operation target apparatuses connected to the operation apparatus through the connection line is increased.

15. The operation system according to claim 1, wherein
the search device, in a case where identification information that is same as the identification information of the apparatus of which the connection information is stored in the memory is acquired, stops a search for the stored apparatus.

16. The operation system according to claim 2, wherein
the search device, in a case where identification information that is same as the identification information of the apparatus of which the connection information is stored in the memory is acquired, stops a search for the stored apparatus.

17. The operation system according to claim 1, wherein
the operation apparatus comprises a removal instructing unit that, in a case where number of the operation target apparatuses connected to the operation apparatus through the connection line is decreased, removes the connection information for the operation target apparatus corresponding to the decrease from the memory.

18. The operation system according to claim 2, wherein
the operation apparatus comprises a removal instructing unit that, in a case where number of the operation target apparatuses connected to the operation apparatus through the connection line is decreased, removes the connection information for the operation target apparatus corresponding to the decrease from the memory.

19. A search device that is built in a first apparatus, which is one of (i) an operation apparatus that includes a display displaying information and an operation unit receiving an operation, is connected to a communication network, and, using the display and the operation unit, enables another apparatus to operate through the communication network and (ii) an operation target apparatus that is connected to the operation apparatus by way of the communication network and by way of a direct connection line and that receives an operation through the communication network, the search device being at least one central processing unit configured to function as:
  a first information acquiring unit that acquires, through the connection line and from a second apparatus connected to the first apparatus with the connection line, identification information used for identifying the second apparatus;
  a second information acquiring unit that acquires, through the communication network and from each of at least one apparatus connected to the first apparatus through the communication network, identification information used for identifying each of the at least one apparatus;
  an apparatus specifying unit that specifies, from among the at least one apparatus for which the identification information is acquired by the second information acquiring unit, an apparatus having same identification information as the identification information of the second apparatus; and
  a storage instructing unit that stores, in a memory built in the operation apparatus, information used for connecting the apparatus specified by the apparatus specifying unit and the first apparatus through the communication network as connection information used for connection to the operation target apparatus through the communication network and operating the operation target apparatus.

20. A search method comprising:
- acquiring, from a second apparatus connected through a connection line to a first apparatus, identification information used for identifying the second apparatus, the first apparatus being that is one of (i) an operation apparatus that includes a display displaying information and an operation unit receiving an operation, is connected to a communication network, and, using the display and the operation unit, enables another apparatus to operate through the communication network and (ii) an operation target apparatus that is connected to the operation apparatus by way of the communication network and by way of the direct connection line and that receives an operation through the communication network;
- acquiring, through the communication network and from each of at least one apparatus connected to the first apparatus through the communication network, identification information used for identifying each of the at least one apparatus;
- specifying, from among the at least one apparatus for which the identification information is acquired, an apparatus having same identification information as the identification information of the second apparatus; and
- storing, in a memory built in the operation apparatus, information used for connecting the apparatus specified and the first apparatus through the communication network as connection information used for connection to the operation target apparatus through the communication network and operating the operation target apparatus.

* * * * *